United States Patent [19]

Stiles

[11] 3,864,459

[45] Feb. 4, 1975

[54] PROCESS FOR THE ECONOMICAL USE OF REFRACTORY REDUCING GASES FOR THE REDUCTION OF SULFUR DIOXIDE

[76] Inventor: Alvin B. Stiles, 1301 Grayson Rd., Wilmington, Del. 19803

[22] Filed: Mar. 26, 1971

[21] Appl. No.: 128,558

Related U.S. Application Data

[63] Continuation-in-part of Ser. No. 818,026, April 21, 1969, abandoned.

[52] U.S. Cl.................. 423/564, 423/570, 423/244
[51] Int. Cl............................................ C01b 17/04
[58] Field of Search.......... 23/226, 225, 2; 252/471, 252/461; 423/244, 569, 570, 564

[56] References Cited
UNITED STATES PATENTS

| | | | |
|---|---|---|---|
| 1,094,767 | 4/1914 | Young | 23/226 |
| 2,043,202 | 6/1936 | Merriam | 23/226 |
| 3,259,453 | 7/1966 | Stiles | 23/2 |
| 3,433,581 | 3/1969 | Stephens et al | 23/2 |
| 3,444,099 | 5/1969 | Taylor et al | 23/2 E X |
| 3,476,513 | 11/1969 | Welty et al. | 23/225 |
| 3,495,941 | 2/1970 | Van Helden | 23/226 |

FOREIGN PATENTS OR APPLICATIONS

| | | | |
|---|---|---|---|
| 854,116 | 4/1940 | France | 23/226 |

*Primary Examiner*—G. O. Peters
*Attorney, Agent, or Firm*—Jean B. Mauro

[57] ABSTRACT

This invention relates to an improved process for catalytically converting sulfur dioxide to elemental sulfur, hydrogen sulfide and other sulfur containing compounds by efficiently utilizing a refractory reducing gas in the presence of a supported catalyst containing thorium oxide in combination with one or more oxides of chromium, manganese, barium, strontium, calcium, tantalum, or mixed rare earth chromites.

8 Claims, 2 Drawing Figures

PROCESS FOR THE ECONOMICAL USE OF REFRACTORY REDUCING GASES FOR THE REDUCTION OF SULFUR DIOXIDE

CROSS-REFERENCE TO RELATED APPLICATIONS

This application is a continuation-in-part of my co-pending application Ser. No. 818,026, filed Apr. 21, 1969 now abandoned.

BACKGROUND OF THE INVENTION

The reduction of sulfur dioxide using hydrocarbons to ultimately produce elemental sulfur therefrom is known to the art.

This invention relates to catalysts which are useful for the efficient utilization of refractory gases such as methane in the initial reduction of sulfur dioxide to elemental sulfur, hydrogen sulfide and other sulfur containing compounds.

In recent years much work has been done to develop technology for the efficient conversion of sulfur dioxide to sulfur. This stems from the need for the elimination of this contaminant from our environment. This is also a result of the increased price of elemental sulfur, for the value of this otherwise wasted sulfur can be expected to offset, to a great extent, the cost of efforts at eliminating sulfur dioxide as an environmental contaminant.

Especially pertinent patents in this field are U.S. Pat. No. 3,199,955 issued to James R. West and Edward H. Conroy on Aug. 10, 1965 and British Pat. No. 1,116,129 issued to Henricus J. A. Van Helden and published on June 6, 1968.

The West and Conroy patent discloses that a reaction between a gaseous hydrocarbon and sulfur dioxide may be effected with an alumina catalyst at a temperature as low as 750°C.

The Van Helden patent teaches that $SO_2$ can be completely converted to hydrogen sulfide at temperatures of from 300° to 600°C when the $SO_2$ gas is mixed with methane or another source of hydrogen and the gas mixture is brought into contact with a catalyst consisting of vanadium oxide and a carrier material such as alumina.

This invention is directed to an improvement in the process for the catalytic reduction of $SO_2$. The Van Helden patent, cited above, is directed to a process for the complete conversion of $SO_2$ to hydrogen sulfide which requires relatively high concentrations of $SO_2$ and large excesses of reducing gas in the reactant stream to accomplish the results he describes. The instant invention is directed to a process that enables a reducing gas such as methane to be, for all practical purposes, completely utilized in the reduction of $SO_2$ at lower temperatures than was heretofore known.

The instant invention is believed to be a valuable improvement in the overall process because it enables the process to be operated in a highly efficient manner. In many if not most instances of pollution abatement there is an overabundant supply of waste gas which contains a harmful, but low percentage of $SO_2$. Perhaps the greatest economic limitation on the operation of such systems becomes the cost of the reducing gas necessary to accomplish reduction of the $SO_2$. As stated above, the instant invention, by providing a process that completely utilizes the reducing gas results in an improvement in the catalytic reduction of $SO_2$ that will enable industry to eliminate sulfur dioxide wastes with greater economy than heretofore has been known to the art. The catalytic compositions of this invention attain the goal of efficient and at the same time economic operation as a result of the essentially complete utilization of the reducing gas.

DESCRIPTION OF THE INVENTION

This invention relates to an improved process for the initial conversion of sulfur dioxide to a mixture of elemental sulfur, to hydrogen sulfide, and other sulfur containing compounds in a multistep process for the conversion of sulfur containing gases to elemental sulfur, the improvement comprising reacting the sulfur dioxide and refractory reducing gas in the presence of a catalyst described below.

Figure 1:
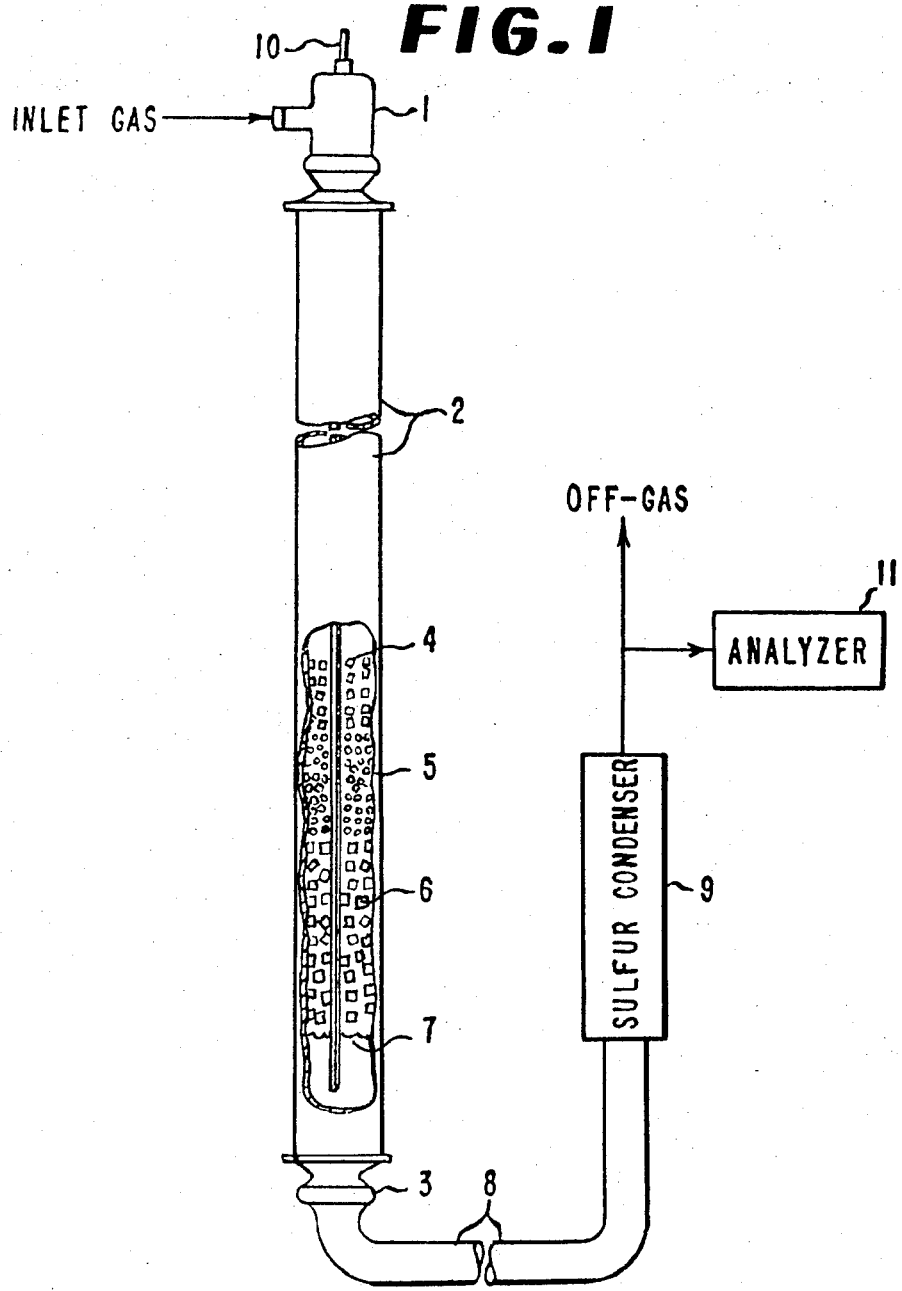
FIG. 1 illustrates a reactor for carrying out the invention.

The process of this invention results in the realization of increased efficiency and economy in effecting the reduction of sulfur dioxide with a refractory reducing gas such as methane, natural gas, ethane, benzene, or mixtures thereof by lowering the required temperature of operation at which essentially complete utilization of the refractory reducing gas is achieved.

By complete utilization of the refractory reducing gas is meant the complete conversion of this fuel gas, for example methane, to products of combustion in equilibrium relationship among the CO, $CO_2$, $H_2$, $H_2O$ and reduced sulfur compounds such as elemental sulfur, $H_2S$, $CS_2$, COS and other reduced sulfur compounds. However, it also includes operation in which $SO_2$ that passes unreacted through the reaction zone is present in the effluent gas in such quantity as to permit the reactions $SO_2 + 2H_2S \rightarrow 2H_2O + 3S$; $SO_2 + 2COS \rightarrow 2CO_2 + 3S$ or $SO_2 + CS_2 \rightarrow CO_2 + 3S$; $SO_2 + 2COS \rightarrow 2CO_2 + S$ to occur in a subsequent catalytic reactor. That is, the total quantity of reducing gases *formed* in the primary reactor, such as CO, COS, $CS_2$, $H_2$, and $H_2S$ approximately balance, in a stoichiometric sense, the amount of unreacted $SO_2$ in the primary reactor effluent. Although the primary reduction is described here as occurring in one stage, in practice several stages may be employed to achieve proper temperature control. For example, an $SO_2$-containing gas may be fed into a first reactor along with less than the stoichiometric quantity of refractory reducing gas, and the effluent therefrom blended with additional cold $SO_2$ and additional refractory reducing gas to cool said effluent, and the mixture thereof then passed into a second reactor stage. However, the total $SO_2$ and other oxidizing gases, such as oxygen, fed to the combined primary reactor system is essentially in stoichiometric proportion with the total refractory reducing gas fed to the system. A fundamental improvement accomplished by the invention is the complete utilization of the fuel as a reducing agent at lower temperatures and higher space velocities than heretofore known to accomplish the conversion of a portion of the $SO_2$ to products which can be reacted with the remaining $SO_2$ at lower temperatures to produce elemental sulfur.

The improvement comprises bringing the reactant gases into contact with a catalyst selected from the group consisting of the oxides of manganese, chromium, barium, strontium, calcium, tantalum, and the rare earth chromites and mixtures of these and supported on a suitable material as described below. The catalysts also contain a thermal stabilizer to help prevent decreases in catalytic activity at high temperature due to loss in catalyst surface area. Suitable stabilizers include thoria or lanthanum oxide. Of the above, thoria is the preferred thermal stabilizer.

The catalytic material is prepared with a support material. Suitable catalyst support materials are alumina, thoria, zirconia, and silica-alumina with high surface area alumina preferred. All of the crystalline forms of alumina may be used, but eta and kappa alumina are preferred for reasons of economics.

Preferred catalysts because of their outstanding performance contain oxides of manganese, chromium and thoria. When manganese and chromium are each present they can be present in a ratio of Mn to Cr of 0.5:3 to 10:1. The amount of thoria used is based primarily on economic considerations and may vary between 0.5% and 25% by weight of the total catalyst and support.

The most preferred catalysts, for reasons of economics, contain 5% by weight each, of the oxides of manganese, chromium and thorium supported on eta or kappa alumina.

The catalysts of this invention will have a surface area of from about 10 m$^2$/g. to 200 m$^2$/g. and even after extended periods of use will be above 5 m$^2$/g. Surface area determinations are made by the BET method well understood in the art.

As stated above, the catalytic compositions of this invention enable the more economic removal of sulfur dioxide from effluent gases produced as a result of many different types of commercial and industrial operations. Such effluent gas streams usually contain gaseous components such as nitrogen, oxygen, water, and carbon dioxide in addition to sulfur dioxide. The sulfur dioxide can be present in an amount of from 5% or less of the effluent stream to 95% or higher of the effluent stream.

It will be understood that the effluent stream is generally freed from dust and other suspended solids prior to the reaction with methane for best catalyst life.

FIG. 1 illustrates a reactor for carrying out the invention.

The sulfur dioxide containing gas stream derived from a source not shown is mixed with a measured amount of refractory reducing gas and introduced at inlet port 1 as the inlet gas, and passes into converter tube 2. The length of converter tube 2 is 15 times the tube 2. The tube contains an inlet port 1, at one end and an exit port 3, at the other end. As the reactor gas stream passes into the converter tube it first encounters a layer of quartz packing 4. The gas passes through the bed of quartz packing 4 and across the catalyst bed 5, and then across a second bed of quartz packing 6. The quartz packing and catalyst material are supported on a stainless steel screen 7. After passing across the quartz packing and catalyst material the now converted gas stream passes out exit port 3 into exit line 8. The gaseous mixture passes through exit line 8 into sulfur condenser 9, where the elemental sulfur formed in the converter tube is removed and the off-gas passes into analyzer 11. Converter tube 2 contains a quartz tube 10 which is sealed at its lower end and used as a thermowell. The off-gas containing H$_2$S and SO$_2$ is passed from the condenser to a second stage in the converter and conversion to elemental sulfur can be completed using art known methods.

To fully realize the valuable contribution of this invention to the art, it must be appreciated that a process for the elimination of sulfur dioxide from effluent waste gases would of necessity be required to purify large volumes of gas in an efficient manner. Therefore, considerations such as the space velocity of the gas stream, temperature, volume percent of reactants in the gaseous phase, ratio of reactants and conversion rate of the catalyst are relevant factors to be considered in the evaluation of a given process as a feasible method for the elimination of pollution from the waste gas.

In the process of this invention, space velocity may range from 100 to 4000 or more volumes of gas [at standard temperature and pressure] per hour per volume of catalyst.

The expression "space velocity" may have several definitions in catalytic literature but herein the term means the total volume of inlet gas at standard temperature and pressure (0°C. 760 mm of mercury) fed per hour divided by the bulk volume of catalyst. It can be seen that if the gas volume were measured at reaction temperature or after the reaction had increased volume (e.g., $2C_2H_6 + 7SO_2 \rightarrow 4CO_2 + 6H_2O + 7S$; volume almost doubles) the space velocity would be much higher than stipulated in our descriptions and examples. Furthermore if, instead of the bulk volume and density of the catalyst, the intrinsic density and volume is used, the space velocity would again be sharply higher. The space velocity as stipulated herein is the most conservative statement of this value. Temperature may range from 650°C. to above 1100°C. Volume percent of reactants in the gaseous phase ranges from less than 1% up to 100%, and the equivalent ratio of SO$_2$ to refractory reducing gas ranges from 0.5:1 to 2.0:1 in an individual reactor stage.

Figure 2:
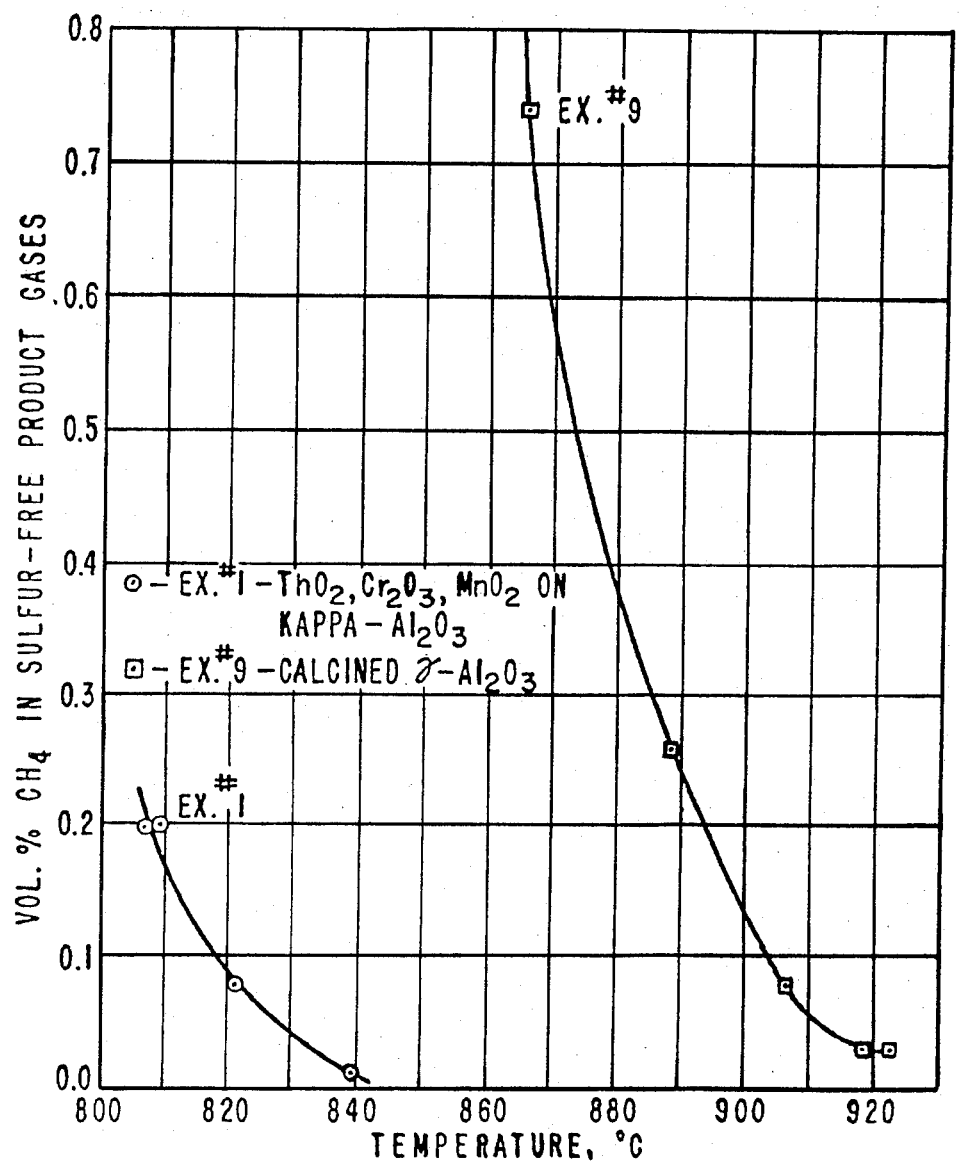
FIG. 2 is a graph which shows the relative efficiency of a catalyst of this invention and an alumina catalyst known to the art.

To further illustrate the increased efficiency obtained using the process of this invention, FIG. 2 is a graph which shows the relative efficiency of a catalyst of this invention plotted as ⊙ and an alumina catalyst known to the art plotted as ▱. The catalyst plotted ⊙ is the catalyst of this invention as prepared in Example 1. The alumina catalyst known to the art is the type described by West and Conroy and is prepared as described in Example 9 below. As can be seen from FIG. 2, the alumina catalyst at otherwise identical operating conditions is markedly low in efficiency as reflected by the higher temperatures required for equivalent methane utilization levels.

As previously discussed, the efficient utilization of the refractory gases implies that the gas is completely oxidized to products of combustion existing in equilibrium relationship, to wit, CO, CO$_2$, H$_2$, H$_2$O, H$_2$S, CS$_2$, COS, and elemental sulfur. The quantity of CO, H$_2$, H$_2$S, CS$_2$, and COS in the products of combustion are usually in approximate stoichiometric proportion to the unreacted portion of SO$_2$ in said products. As explained above, the primary reactor may be divided into several stages, and in an individual stage the reducing gas to oxidizing gas ratio may not be stoichiometric. There is little or no unoxidized hydrocarbon in the effluent of the primary converter.

The efficient use of the refractory fuel and reducing gas furthermore implies that the reaction is performed rapidly, i.e. at a high space velocity and at relatively moderate temperatures. It has been found that the refractory reducing gas is most efficiently consumed in the reduction of $SO_2$ using the catalysts of this invention at temperatures of from 650°C. to 1050°C. At practical space velocities, preferred catalytic compositions give efficient and economic utilization of the reducing gas at temperatures of from 845°C. and upwards.

It is well known to the art that other factors being equal, an inferior catalyst can be made to provide good conversion of sulfur dioxide by operating the system at high temperatures, at low space velocities, or with a large excess of reducing gases. It is therefore obvious to those skilled in the art that a process operated using an inferior catalyst would of necessity be inefficient and/or uneconomical either because the necessary apparatus would have to be built to withstand high temperatures, would have to be excessively large or the cost of excess reducing gas would be prohibitive. Therefore, the catalysts utilized in the process of this invention have as their objective the achievement of economical operating conditions which is exhibited by the complete utilization of the refractory reducing gas and efficient operation at temperatures not possible with art known catalysts. Such lower temperature operation will result in additional savings, for as will be recognized by the art, lower temperatures of operation results in longer catalyst life with a corresponding reduction in downtime for catalyst replacement.

The following examples are presented to further illustrate this invention and also to demonstrate the improvement afforded by the instant invention when compared with the process as operated using art-known catalysts. To provide a valid basis for comparison in the following examples the space velocity, concentration of reactants, ratio of reactants and utilization of the refractory gas, methane, have been controlled to allow a comparison of effectiveness. As will be noted, tests have been run under more than one set of reaction conditions to broadly demonstrate the contribution made to the art. In these examples temperature is the variable which is used as the basis to compare the efficiency of the various catalysts.

EXAMPLE 1

One thousand parts of a special aluminum hydroxide is calcined at 600°C. for 3 hours. This aluminum hydroxide is designated by the trade name Catapal and is a by-product obtained by the Continental Oil Company in their synthesis of normal octanol and normal alcohols with an even number of carbon atoms above octanol. The alumina by-product is an aluminum hydroxide having very low impurity level except for carbonaceous material. The alumina hydrate is calcined in air to convert the aluminum hydroxide to aluminum oxide and oxidize and remove the carbonaceous materials. Approximately 3 hours' exposure as a layer no greater than 1 inch thick at 600°C. will suffice both to decompose the hydroxide and oxidize the carbonaceous impurity.

Four hundred parts of the calcined alumina hydrate is charged to a suitably sized ceramic ball mill containing a mixture of ½, ¾, and 1 inch ceramic balls. There is charged also to the ball mill 122 parts of thorium tetranitrate tetrahydrate, 61 parts of chromium trinitrate nonahydrate, 149 parts of manganese dinitrate as a 50% solution (74.5 parts of anhydrous manganese dinitrate), 37 parts of 70% nitric acid solution, and 7000 parts of distilled water.

The ball mill is rotated for 6 hours which is sufficient to produce a uniform paste. The paste is removed from the ball mill and placed in Inconel dishes. Inconel is a thermally resistant alloy and is a trade name of the International Nickel Company.

The wet paste is dried, then is finally calcined at 1000°C. for 5 hours at this temperature.

The calcined catalyst when cool is crushed and screened into 8 to 12 mesh granules for use in the subsequent operation. It should be noted that instead of using the catalyst as a granular material it can be pulverized to 100% through a 10 mesh screen, mixed with 1% graphite, and pilled to form ⅛ inch × ⅛ inch cylinders as an example. Other shapes and forms are obviously possible.

The surface area of the granular catalyst obtained in the preceding paragraph is 64 m²/g. The alumina is identified by X-ray examination to be kappa alumina.

One hundred volumes of the 8–12 mesh granules is placed in the test converter shown in FIG. 1. The converter comprises a tube having a length 15 times the internal diameter. The tube is closed at both ends with the exception of an inlet port at the top and an L-shaped exit port at the bottom. Connected to the inlet port is an inlet gas line through which is passed metered quantities of gas totaling 4160 volumes per minute of gas comprising 5.1% methane, 1.2% carbon dioxide, 6.1% water, 77.4% nitrogen, 0.5% oxygen, and 9.7% sulfur dioxide (methane, $O_2$ and $SO_2$ stoichiometrically balanced, i.e. $CH_4 + O_2 + SO_2 \rightarrow CO_2 + H_2O + S$ if reaction went to completion). In reality the methane is essentially completely consumed, but it is not all oxidized to $CO_2$ and $H_2O$. Instead, some of the methane is reformed to CO, COS, $H_2$, $CS_2$, and $H_2S$, all of which can react with $SO_2$ at lower temperatures.

The exit gas line permits the exit gases to be passed through a condenser for the removal of the elemental sulfur formed in the converter and then into an analyzer where residual unreacted methane is determined. The converter tube is heated by means of a split tube furnace capable of heating the incoming gases to a level as high as 1100°C. An internal thermocouple well permits the exploration of the axial temperature levels.

With the gas flow at the level stipulated above and the composition also as stipulated, the temperature in the furnace is varied through the range 800°C. to 1050°C. With the catalyst of this example methane leakage is negligible at all temperatures equal to or above 845°C.

This efficient use of the hydrocarbons and reaction of the $SO_2$ evidences the high economic efficiency at high space velocities and relatively low temperature possible by this technique. That is, the methane was almost completely consumed and simultaneously the $SO_2$ was reduced, in large part, to elemental sulfur, COS, $H_2S$, and $CS_2$. The CO, $H_2$, COS, $H_2S$, and $CS_2$ formed in the reaction can reduce the remaining $SO_2$ in a lower temperature environment.

Instead of the nitrate salts as stipulated in the second paragraph of this example, stoichiometrically equivalent quantities of manganese, thorium or chromium can be used as sulfates, chlorides, acetates, or other soluble and economically suitable salts.

Instead of the 5.1% methane stipulated in the seventh paragraph of this example, there can be used a stoichiometrically equivalent amount on a carbon and hydrogen basis of other refractory gases such as natural gas, ethane, benzene and mixtures thereof.

The following example is presented to demonstrate the effect of space velocity on the temperature required for complete methane utilization when other operating conditions in a given system are maintained. As is demonstrated essentially complete conversion of $SO_2$ is attained at a lower temperature when space velocity of the reactant gas is decreased.

EXAMPLE 2

One hundred volumes of the catalyst of Example 1 is placed in the test converter of FIG. 1. Metered quantities of the gas mixture described in Example 1 totaling 166 volumes per minute are passed across the 100 volumes of catalyst. Complete methane conversion is observed at a temperature of 650°C. Concomitant with the complete utilization of the methane, the $SO_2$ is in large part reduced to elemental S, $CS_2$, COS and $H_2S$, however the relative proportion of these components varies because at the lower temperature the equilibrium concentration differs from that obtained at the higher temperature in Example 1.

EXAMPLE 3

A catalyst is prepared as described in Example 1 above with the exception that the only ingredients employed are kappa-alumina, water and nitric acid. The product is kappa-alumina having a surface area of 37 m²/g. The kappa-alumina thus produced (100 volumes) is placed in the test converter of FIG. 1 and when the conditions described in Example 1 are employed complete utilization of the methane to form elemental sulfur, $CO_2$, $H_2O$, CO, $H_2$, COS, $CS_2$, and $H_2S$, the latter five gases being present in the reactor effluent in approximately stoichiometric proportion to the unreacted $SO_2$ therein, can be attained only at temperatures equal to or above 980°C. These data demonstrate directly the advantage of the catalystcompositions of this invention.

EXAMPLE 4

A catalyst is prepared as described in Example 1 above but the alumina and nitric acid are not included in the composition. The resultant granular product has a surface area of 10 m²/g. One hundred volumes of the catalyst thus produced is placed in the test converter of FIG. 1 and when the conditions described in Example 1 are employed complete utilization of the methane in the reduction of $SO_2$ can be attained only at temperatures equal to or above 980°C. This result indicates that the catalytic components do not operate at optimum efficiency in the process of this invention in the absence of a support material.

EXAMPLE 5

The catalyst of this example is prepared starting with 700 parts by weight of gamma aluminum oxide, 150 parts by weight of chromium nitrate nonahydrate, 150 parts by weight of manganese nitrate as a 50% solution (75 parts of anhydrous manganese nitrate) and 1000 parts by weight of distilled water. These ingredients are milled together for 17 hours, are then dried and as before are calcined at 1000°C. for 3 hours. The surface area of this catalyst is 13 m²/g. when converted to 8-12 mesh granules as described above.

This catalyst is charged as a 50 parts by volume catalyst charge to the equipment of Example 1. Gas flow is maintained at 2083 volumes per minute. Complete conversion of the methane in the reaction with $SO_2$ is attained at temperatures equal to or in excess of 950°C. The catalyst charge and gas flow rate used in this example result in the identical space velocity (2500 volumes of gas/hr./volume of catalyst) as used in the preceding examples, except Example 2, so that direct comparisons are proper. Thus, these data indicate the critical role thoria plays in producing a thermally stable catalyst as evidenced in the optimum results as becomes evident when the catalyst of this example is compared with the catalyst of Example 1.

EXAMPLE 6

The catalyst of this example is prepared as described in Example 1 with the exception that the charge to the ball mill is 700 parts by weight of kappa aluminum oxide, 1000 parts by weight of distilled water, 52 parts by weight of barium nitrate, 90 parts by weight of calcium nitrate, and 85 parts by weight of strontium nitrate. These are milled together for 18 hours, are removed as a uniform paste from the mill, are dried at 125°C., and are finally calcined at 1000°C. for 3 hours. The product is screened to 100% through a 10 mesh screen and is mixed with 1% graphite, is pilled and the pills are heat treated at 600°C. for 3 hours to remove the graphite.

The pilled catalyst thus derived has a surface area of 60 m²/g. and is charged as a 50 parts by volume catalyst charge to the equipment of Example 1. Gas flow is maintained at 2083 volumes per minutes as in Example 5 and during the temperature exploration for this catalyst, complete conversion of the methane in the reaction with $SO_2$ to form elemental sulfur, $CO_2$, $H_2O$, CO, $H_2$, COS, $CS_2$, and $H_2S$, is effected at temperatures equal to or above 920°C.

EXAMPLE 7

The catalyst of this example is prepared by charging to the ball mill of Example 1, 700 parts by weight of the alumina of the type of Example 1 and 70 parts by weight of tantalum pentachloride dissolved in 1000 parts by weight of distilled water. The ball mill is rotated for 18 hours and the resultant uniform slurry is dried, calcined at 1000°C. for 3 hours and is then converted to 8-12 mesh granules. The surface area of this catalyst is 64 m²/g.

When this catalyst is tested as in Example 5, complete utilization of the methane in the reduction of $SO_2$ is attained at temperatures equal to or above 927°C.

EXAMPLE 8

A catalyst is prepared by dissolving 135 parts of rare earth carbonates designated in the trade as mixed carbonates and comprising the following constituents. This is expressed as an average value and a $CO_2$-free basis.

| | |
|---|---|
| yttrium | 2.6 % |
| lanthanum | 21.7 % |
| cerium | 46.9 % |
| praseodymium | 5.8 % |
| neodymium | 15.9 % |
| samarium | 3.4 % |

-Continued

| | |
|---|---|
| gadolinium | 2.1% |
| DYSPROSIUM | .74% |
| europium }<br>holmium<br>erbium<br>thulium<br>ytterbium<br>lutetium | each present in less than 0.2% each. |

The foregoing 135 parts by weight of mixed rare earth carbonates are slurried and agitated in a sufficiently large vessel to accommodate the rare earths as well as 500 parts by weight of distilled water and the additional ingredients which include 280 parts by weight of 70% nitric acid, 115 parts by weight of chromic acid anhydride, $CrO_3$, together with 130 parts by weight of 28% ammonium hydroxide which is added lastly to the above at 35°C. to effect precipitation of the rare earth chromites. This precipitate is agitated for 30 minutes, and is then filtered. This entire filter cake is charged to a suitably sized ball mill along with 700 parts by weight of the aluminum oxide of Example 1. Additionally, there is put into the ball mill 800 parts by weight of distilled water. These are milled together for 18 hours. The resultant paste is dried and finally calcined at 1000°C. for 3 hours to produce a catalyst having a surface area of 72 m²/g.

The catalyst is evaluated as described in Example 5 under which conditions complete utilization and conversion of the methane in the reaction with $SO_2$ is attained at temperatures equal to or in excess of 915°C.

The next two examples show the use of previously known catalytic materials. These examples are included so that direct comparisons between the catalysts of this invention and the previously known catalysts can be made under identical conditions.

EXAMPLE 9

This example illustrates the use of an alumina catalyst of the type exemplified by West and Conroy U.S. Pat. No. 3,199,955.

One hundred volumes of gamma alumina as 8-12 mesh granules are calcined at 1000°C. for 3 hours and are then tested in the equipment and under the conditions described in Example 1. Surface area after calcining is 29 m²/g. Complete conversion of the methane in the reaction with $SO_2$ is attained at temperatures at and in excess of 935°C., a temperature 90° higher than that required for the catalyst of Example 1. In commercial applications, this differential in operating conditions using the catalytic compositions of this invention would result in substantial operating economics in ridding waste gases of sulfur dioxide.

EXAMPLE 10

This example illustrates the use of a catalyst of the type claimed in Van Helden's British Pat. No. 1,116,129.

To the same ball mill described in Example 1 is charged 700 parts of the kappa alumina prepared as described in Example 1 together with 70 parts of ammonium vanadate and 1000 parts of distilled water. The ball mill is rotated for 18 hours and the resultant paste is dried, then calcined at 1000°C. for 3 hours. This calcined cake is crushed and screened to produce 8-12 mesh granules; surface area is 2m²/g. When this catalyst is evaluated in the equipment of Example 1 and under conditions described for Example 1, total conversion of the methane in the reduction of $SO_2$ is effected at temperatures equal to or in excess of 1015°C., a temperature 170°C. higher than the temperature required in Example 1.

The following examples are run with a reactant gas stream containing higher concentrations of methane and sulfur dioxide than is employed in the preceding examples. This change in operating conditions is presented to demonstrate the improvement obtained by using the catalysts of this invention under another set of conditions with higher concentrations of reactants. In general higher temperatures are required to achieve complete methane utilization.

EXAMPLE 11

Granular eta-alumina derived by the hydrolysis of aluminum alcoholate which is available in commerce is crushed and screened to produce 8-12 mesh material and is then calcined for 3 hours at 1000°C.; the surface area of this material is 50 m²/g.

Three hundred parts eta-alumina prepared as described above are further treated by impregnation with the following: 70% by weight of an aqueous solution comprising 8.4% by weight of thorium tetranitrate tetrahydrate, 4.8% by weight of chromium trinitrate nonahydrate, and 10.2% by weight of manganese dinitrate as a 50% solution (5.1% by weight of anhydrous manganese nitrate). The granules are thoroughly impregnated with the solution which is then dried completely onto the granules. After the salts are completely dried onto the granules, the granules are calcined at 500°C. for 10 minutes. Thereafter the coated material is impregnated with an identical quantity and volume of solution as used in the first impregnation. After the second coating and impregnation, the granules are dried and then calcined at 900°C. for 3 hours. Surface area is 70 m²/g.

The catalyst thus derived is tested on a gas stream comprising 28.2% methane, 1.3% carbon dioxide, 4.1% water vapor, 10.0% nitrogen, 0.1% oxygen, and 56.3% sulfur dioxide. This gas is passed over the catalyst at a rate of 2075 vol./min., the catalyst volume being 50 volumes. Except for these operating condition changes the conditions are the same as described in Example 1. The temperature of the catalyst environment is increased and decreased through the 900°–1100°C. range. Complete utilization of the methane in the reaction with $SO_2$ to form elemental sulfur, $H_2O$, $CO_2$, CO, $H_2$, COS, $CS_2$, and $H_2$, is attained at temperatures equal to or in excess of 935°C.

EXAMPLE 12

This example illustrates the use of an alumina catalyst of the type exemplified by West and Conroy U.S. Pat. No. 3,199,955. A catalyst is prepared by obtaining granular eta-alumina derived by the hydrolysis of aluminum alcoholate which is available in commerce. The granular eta-alumina is crushed and screened to product 8-12 mesh material and then is calcined for 3 hours at 1000°C.; surface area is 50 m²/g.

Fifty volumes of the catalyst thus derived are evaluated under the conditions and in the equipment of Example 11. Complete methane cleanup and utilization in the reduction of $SO_2$ are obtained at temperatures equal to or in excess of 985°C., a temperature 50°C. highger than that of Example 11.

Example 13

The catalyst and conditions of Example 11 are used with the exception that the operating temperature is lowered to 920°C. Under these conditions the quantity of unreacted methane passed through the converter is equivalent to 1.4% of that which was fed.

In order to compare this catalyst with gamma-alumina of art, gamma-alumina having a surface area of 95 m$^2$/g. and provided by Harshaw Chemical Company of Cleveland, Ohio, is placed in the converter and operated under the identical conditions described above for the catalyst comprising eta-alumina impregnated with thoria, manganese and chromium oxides. When the gamma-alumina is evaluated at 920°C., the quantity of methane which leaks through the converter amounts to 7% of that which is fed.

It is obvious from these tests that the catalyst used in the first two paragraphs of Example 11 is much more effective for the economic utilization of the methane in that under identical conditions the alumina catalyst of the art permits five times as much methane to pass unreacted through the converter. This, of course, is of very significant economic importance when methane is used as the reducing gas.

The following examples are presented to illustrate the process of this invention where the catalyst employed is supported on alpha-alumina, a commonly used catalyst support material. Examples 14 and 15 are presented to illustrate the operating temperature necessary to achieve reduction of SO$_2$ with complete methane utilization using only alpha-alumina. Examples 16 and 17 are presented to illustrate the improvement obtained when the process is operated using the catalyst of this invention.

EXAMPLE 14

A methane reforming catalyst designated G56F ($\alpha$-Al$_2$O$_3$) produced by the Girdler Corporation of Louisville, Kentucky, is crushed and screened to produce 8-12 mesh material having a surface area of 1.9 m$^2$/g.

Fifty volumes of catalyst thus derived is tested on a gas stream comprising 28.2% methane, 1.3% carbon dioxide, 4.1% water vapor, 10.0% nitrogen, 0.1% oxygen and 56.3% sulfur dioxide. The gas is passed over the catalyst at a rate of 2075 vol./min. The temperature of the catalyst environment is increased and decreased through a temperature range between 900°C. to 1100°C. Complete utilization of the methane in the reaction with SO$_2$ is attained at temperatures equal to or in excess of 1045°C., a temperature 110°C. higher than that required for the catalyst of this invention.

EXAMPLE 15

An alpha-aluminum oxide catalyst designated by the code SAHT-99 and available from the Carborundum Company of Niagara Falls, N.Y., is prepared as 8-12 mesh granules having a surface area of 1.6 m$^2$/g.

Fifty volumes of catalyst are placed in the test converter as shown in FIG. 1 and is tested under the conditions described in Example 11. Complete utilization of the methane in the reaction with SO$_2$ is attained at a temperature of 1050°C. or above.

EXAMPLE 16

The catalyst of this example is prepared by first making a solution comprising 4.2 parts by weight of thorium tetranitrate tetrahydrate, 4.9 parts by weight of chromium trinitrate nonahydrate, 5.1 parts by weight of manganese dinitrate as a 50% solution (2.55 parts by weight of manganese dinitrate) in sufficient water to produce 40 parts by weight of aqueous solution; 55 parts by weight of alpha-alumina having 1.6 m$^2$/g. and of the type used in Example 15 is prepared as 8-12 mesh granules. The 40 parts by weight of aqueous solution is impregnated onto the granular alpha-alumina, is dried and is then calcined at 900°C. The catalyst surface area after impregnation with all of the aforementioned salts is 2.2 m$^2$/g.

The catalyst thus obtained is evaluated under conditions described in Example 11 with the result that complete utilization of the methane in the reduction of SO$_2$ is obtained at all temperatures equal to and above 1000°C., a temperature about 40°C. lower than that required for alpha-alumina alone (Examples 14 and 15).

EXAMPLE 17

The catalyst of this example is prepared on the alpha-alumina of Example 14. There is first prepared 60 parts by weight of the granular alpha-alumina as 8-12 mesh material. There is also prepared 60 parts by weight of an aqueous solution in which is dissolved 8.4 parts by weight of thorium tetranitrate tetrahydrate, 4.8 parts by weight of chromium trinitrate nonahydrate, 4.8 parts by weight of chromium trinitrate nonahydrate, and 5.1 parts by weight of manganese dinitrate as a 50% solution (2.55 parts by weight of manganese dinitrate anhydrous). The above solution is impregnated and dried onto the granular support material which is then calcined at 500°C. for 10 minutes. Thereafter, an identical quantity of solution of the same composition is impregnated for a second time onto the previously impregnated granules. Following this impregnation and drying, the granules are calcined at 900°C. for 3 hours. The surface area of the finished granules is 2.3 m$^2$/g.

This catalyst is examined under the conditions and in the equipment of Example 11. Complete utilization of the methane in the reaction with SO$_2$ is attained at temperatures equal to and in excess of 1005°C.

I claim:

1. In a process of reducing sulfur dioxide with a refractory gas selected from the group methane, ethane, benzene, natural gas and mixtures thereof to produce elemental sulfur, hydrogen sulfide, carbonyl sulfide, and carbon disulfide, along with carbon monoxide and elemental hydrogen which can be further utilized in reduction of SO$_2$, and carbon dioxide and water; the improvement for providing substantially complete oxidation of the refractory gas at efficient space velocities and temperatures, which comprises contacting, in essentially stoichiometric proportion, a reactant gas stream comprising sulfur dioxide and the refractory reducing gas with a supported catalyst selected from the group consisting of the oxides of manganese, chromium, barium, strontium, calcium, tantalum, and the rare earth chromites and mixtures and solid state reaction products thereof in combination with thoria and lanthanum at a temperature of at least 650°C. at a space velocity of at least 100 hr.$^{-1}$.

2. The process of claim 1 in which the support is gamma-, eta- or kappa-alumina.

3. The process of claim 1 in which the space velocity is above 2000 hr.$^{-1}$ and the temperature exceeds 845°C.

4. The process of claim 1 in which the catalyst is selected from the group consisting of the oxides of manganese, chromium and thorium supported on gamma-, eta- or kappa-alumina.

5. The process of claim 1 wherein the sulfur dioxide comprises from 5% to 70% by volume of the reactant gas stream.

6. The process of claim 1 wherein the surface area of the catalyst is within the range of 10 to 200 m$^2$/g.

7. The process of claim 1 wherein the temperature is less than 925°C. and the volume percent of sulfur dioxide in the reactant stream is less than about 20%.

8. The process of claim 1 wherein the temperature is within the range of about 925°C. to 1100°C. and the volume percent of sulfur dioxide in the reactant stream is within the range of about 20% to 70%.

* * * * *